US00RE37997E

(19) United States
(12) Reissued Patent
Tuttle

(10) Patent Number: US RE37,997 E
(45) Date of Reissued Patent: Feb. 18, 2003

(54) POLISHING PAD WITH CONTROLLED ABRASION RATE

(75) Inventor: Mark E. Tuttle, Boise, ID (US)

(73) Assignee: Micron Technology, Inc., Boise, ID (US)

( * ) Notice: This patent issued on a continued prosecution application filed under 37 CFR 1.53(d), and is subject to the twenty year patent term provisions of 35 U.S.C. 154(a)(2).

(21) Appl. No.: 08/624,783

(22) Filed: Mar. 27, 1996

Related U.S. Patent Documents

Reissue of:
(64) Patent No.: 5,297,364
Issued: Mar. 29, 1994
Appl. No.: 07/773,477
Filed: Oct. 9, 1991

U.S. Applications:

(63) Continuation-in-part of application No. 07/468,348, filed on Jan. 22, 1990, now Pat. No. 5,177,908, and a continuation-in-part of application No. 07/562,288, filed on Aug. 3, 1990, now Pat. No. 5,020,283.

(51) Int. Cl.[7] ..... B24D 11/00
(52) U.S. Cl. ..... 451/548; 451/550; 451/287; 451/527; 451/921
(58) Field of Search ..... 451/41, 43, 124, 451/278, 285, 286, 287, 288, 289, 259, 449, 527, 529, 530, 538, 539, 547, 548, 550, 921

(56) References Cited

U.S. PATENT DOCUMENTS

| | | | | |
|---|---|---|---|---|
| 816,461 A | | 3/1906 | Gorton | |
| 888,129 A | | 5/1908 | Tone | |
| 959,054 A | | 5/1910 | Glover | |
| 1,953,983 A | * | 4/1934 | Benner | 451/527 |
| 2,242,877 A | | 5/1941 | Albertson | |

(List continued on next page.)

FOREIGN PATENT DOCUMENTS

| | | | | |
|---|---|---|---|---|
| CA | 679731 | | 2/1964 | |
| EP | 0 318 135 A2 | | 5/1989 | |
| EP | 0 439 124 | | 7/1991 | |
| FR | 1195595 | | 12/1958 | |
| FR | 2 063 961 | | 7/1971 | |
| FR | 69.34956 | | 7/1971 | |
| GB | 26287 | | 11/1907 | |
| GB | 2043501 | * | 10/1980 | 451/921 |
| GB | 2 043501 | | 10/1990 | |
| JP | 51-137998 | | 11/1976 | |
| JP | 51-137999 | | 11/1976 | |
| JP | 51-138038 | | 11/1976 | |
| JP | 62-99072 | | 8/1987 | |
| JP | 62241648 | | 10/1987 | |
| JP | 01153263 | | 6/1989 | |
| JP | 03277465 | | 12/1991 | |
| SU | 1206067 | | 1/1986 | |

*Primary Examiner*—Timothy V. Eley
(74) *Attorney, Agent, or Firm*—TraskBritt

(57) ABSTRACT

A polishing pad is provided, having its face shaped to produce controlled nonuniform removal of material from a workpiece. Non-uniformity is produced as a function of distance from the pad's rotational axis (the working radius). The pad face is configured with both raised, contact regions and voided, non-contact regions such that arcuate abrasive contact varies nonuniformly as a function of distance from the pad's rotational axis. Void density at any distance may be produced by several techniques such as varying void size as a function of working radius or varying the number of voids per unit area as a function of working radius. Either technique produces variation in voided area per total unit area for rings of pad surface concentric with the rotational axis having infintesimally small width.

29 Claims, 5 Drawing Sheets

U.S. PATENT DOCUMENTS

| | | | | | |
|---|---|---|---|---|---|
| 2,409,953 | A | | 10/1946 | Pash | |
| 2,653,428 | A | | 9/1953 | Fuller | |
| 2,749,681 | A | | 6/1956 | Reidenbach | |
| 2,749,683 | A | * | 6/1956 | Soderman | 451/550 |
| 3,468,079 | A | | 9/1969 | Kaufman | |
| 3,495,362 | A | | 2/1970 | Hillenbrand | |
| 3,517,466 | A | | 6/1970 | Bouvier | |
| 4,244,775 | A | | 1/1981 | D'Asaro | |
| 4,271,640 | A | * | 6/1981 | Gadbois et al. | 451/527 |
| RE31,053 | E | | 10/1982 | Firtion et al. | |
| 4,373,991 | A | | 2/1983 | Banks | |
| 4,621,458 | A | | 11/1986 | Smith | |
| 4,663,890 | A | | 5/1987 | Brandt | |
| 4,671,851 | A | | 6/1987 | Beyer et al. | |
| 4,679,359 | A | | 7/1987 | Suzuki | |
| 4,693,036 | A | | 9/1987 | Mori | |
| 4,715,150 | A | | 12/1987 | Takeuchi et al. | |
| 4,739,589 | A | | 4/1988 | Brehm et al. | |
| 4,773,185 | A | | 9/1988 | Taira | |
| 4,789,424 | A | | 12/1988 | Fornadel et al. | |
| 4,811,522 | A | | 3/1989 | Gill, Jr. | |
| 4,821,461 | A | | 4/1989 | Holmstrand | |
| 4,843,766 | A | | 7/1989 | Umeda | |
| 4,918,872 | A | | 4/1990 | Sato et al. | |
| 5,020,283 | A | | 6/1991 | Tuttle | |
| 5,131,190 | A | | 7/1992 | Gougouyan | |
| 5,137,597 | A | | 8/1992 | Curry, II et al. | |
| 5,142,828 | A | | 9/1992 | Curry, II | |
| 5,177,908 | A | | 1/1993 | Tuttle | |
| 5,329,734 | A | * | 7/1994 | Yu | 451/921 X |

* cited by examiner

AMENDED

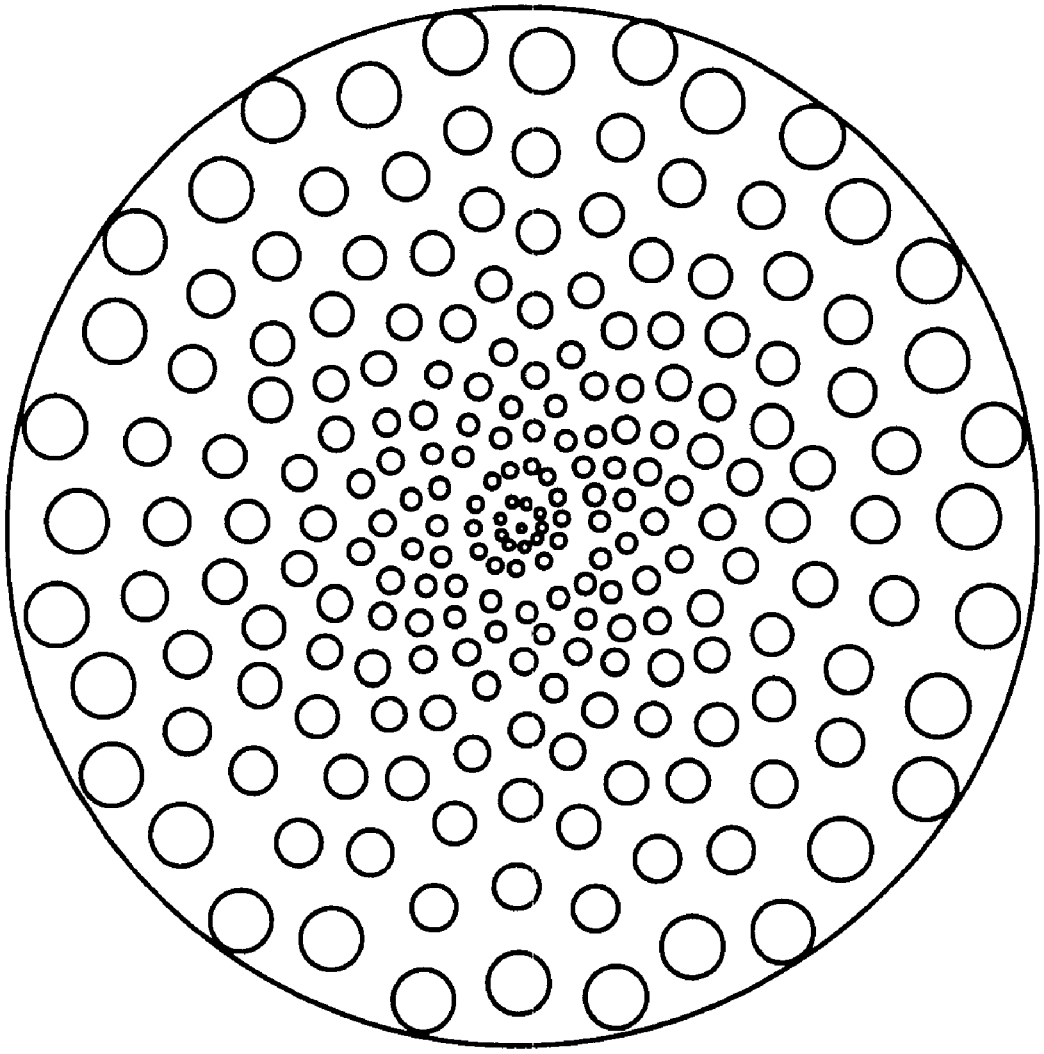
*Fig. 6*
*NEW*

POLISHING PAD WITH CONTROLLED ABRASION RATE

Matter enclosed in heavy brackets [ ] appears in the original patent but forms no part of this reissue specification; matter printed in italics indicates the additions made by reissue.

CROSS-REFERENCE TO RELATED APPLICATION

This is a continuation-in-part to U.S. Pat. application No. 7/468,348, filed Jan. 22, 1990 (allowed, but not yet issued), and of U.S. Pat. application No. 7/562,288, filed Aug. 3, 1990, now U.S. Pat. No. 5,020,283.

BACKGROUND OF THE INVENTION

1. Field of the Invention

This invention relates to the grinding or polishing of a workpiece, in particular the polishing of a surface, such as *a* semiconductor wafer surface to a controlled degree of planarity.

2. Description of the Related Art

In the manufacture of integrated circuits, for example, planarity of the underlying semiconductor substrate of wafer is very important. Critical geometries of integrated circuitry are presently in the neighborhood of less than 1 micron. These geometries are by necessity produced by photolithographic means: an image is optically or electromagnetically focused and chemically processed on the wafer. If the wafer surface is not sufficiently planar, some regions will be in focus and clearly defined, and other regions will not be sufficiently well defined, resulting in a nonfunctional or less than optimal circuit. Planarity of semiconductor wafers is therefore necessary.

In some processes, material is deposited nonuniformly across the wafer, often varying in thickness as a function of radial distance from the center of the wafer. While it is often desired to provide uniform abrasion with a polishing pad, there are also circumstances in which a controlled non-uniformity of abrasion is desired. This would occur in cases in which the non-uniformity of deposit is to be eliminated through polishing, in cases in which a surface is to be made nonuniform, and in order to compensate for non-uniformity of the process.

Chemical and mechanical means, and their combination (the combination being known as "mechanically enhanced chemical polishing"), have been employed, to effect planarity of a wafer. In mechanically enhanced chemical polishing, a chemical etch rate on high topographies of the wafer is assisted by mechanical energy.

FIGS. 1A and 1B illustrate the basic principles used in prior art mechanical wafer polishing. A ring-shaped section of a polishing pad rotates at $W_p$ radians per second (R/s) about axis O. A wafer to be polished is rotated at $W_w$ R/s, usually in the same sense. The wafer may also be rotated in the opposite sense and may be moved in directions +X and −X relative to some fixed point, the wafer face is pressed against the rotating pad face to accomplish polishing. The pad face, itself, which is typically characterized by low abrasivity, is generally used in combination with a mechanically abrasive slurry, which may also contain a chemical etchant.

FIG. 2 helps to clarify rotation $W_w$ and the ring shape of the pad in FIG. 1. For a generic circular pad moving at a particular rotational speed, the linear speed of the polishing face at any given radius will vary according to the relationship L=Wp×R, where L is in cm/s, W is in radians/second, and radius R is in cm. It can be seen, for example, that linear speed $L_2$ at large radius $R_2$ is greater than linear speed $L_1$ at small radius $R_1$. Consider now that the pad has a surface contact rate with a workpiece that varies according to radius. Portions of a workpiece, such as a wafer, contacting the pad face at radius $R_1$ experience a surface contact rate proportional to $L_1$. Similarly, portions of the wafer contacting the pad face at radius $R_2$ will experience a surface contact rate proportional to $L_2$. Since $L_2>L_1$, it is apparent that a workpiece at radius $R_2$ will receive more surface contact than a workpiece at radius $R_1$. If a wafer is large enough in comparison to the pad to be polished at both $R_1$ and $R_2$, the wafer will be polished at an uneven rate which is a function of the $2\pi R$, where R is distance from the rotational axis of the pad. The resulting $2\pi R$ non-planarity is not acceptable for high precision polishing required for semiconductor wafers.

While there are instances in which planar abrasion is desired, there are other instances in which a controller variation in abrasion is desired. This would occur where material buildup is non-planar and polishing is used to generate a planar surface, and in instances where a specified degree of nonplanarity is desired. Non-planar abrasion may also be used in order to compensate for non-uniformity of the process, as for example, when an edge of a semiconductor wafer polishes differently from the center of the wafer.

Referring again to the prior art of FIG. 1, a common approach by which prior art attempts to overcome non-uniform surface contact rate is by using a ring-shaped pad or the outer circumference of a circular pad, to limit the difference between the largest usable radius and smallest usable radius, thus limiting surface contact rate variation across the pad face, and by moving the wafer and positively rotating it, relative to the pad and its rotation. The combination is intended to limit the inherent variableness of the surface contact rate across the wafer, thereby minimizing non-planarity. Such movement of the wafer with respect to the polishing pad's axis of rotation requires special gearing and design tolerances to perform optimally.

According to the disclosure of U.S. Pat. No. [468,348]*5, 177,908*, of which this is a continuation-in-part, the face of a polishing pad is shaped so as to provide substantially constant arcuate contact with a workpiece for circumferential traces of any radius from the center of the pad. This is accomplished by incorporating both raised and voided areas into the face of the pad in a geometric pattern that results in an increase in voided area density as the radius from the rotational axis of the pad increases. Several possible geometric face patterns are disclosed, each of which substantially achieves the goal of providing substantially constant arcuate contact for any given radius. This, in turn, results in more uniform removal of material from workpiece surfaces during mechanical planarization, thus enhancing planarity of the finished surface.

Although surface planarity is often the goal of an abrasive operation, the attainment of a non-planar surface may also be the desired result. The creation of non-planar surfaces is more complicated than the creation of planar surfaces. Using contemporary techniques, this generally requires careful control of the movement of the polishing pad's axis of rotation in relation to the position of the workpiece.

The object of the present invention to provide a polishing pad with which precision non-planar surfaces may be created.

SUMMARY OF THE INVENTION

According to the invention, a polishing pad is provided, having its face shaped to produce controlled nonuniform removal of workpiece material. Non-uniformity is produced as a function of distance from the pad's rotational axis (the working radius). The pad face is configured with both contact regions and voided regions such that arcuate abrasive contact varies nonuniformly with distance from the pad's rotational axis. Void density at any distance may be produced by several techniques such as varying void size as a function of working radius or varying the number of voids per unit area as a function of working radius. Either technique produces variation in voided area per total unit area for rings of pad surface, concentric with the rotational axis, having infinitesimally small width.

BRIEF DESCRIPTION OF THE DRAWINGS

*FIG. 6 shows an additional embodiment of the inventive polishing pad.*

DETAILED DESCRIPTION OF THE PREFERRED EMBODIMENT

Figure 1A:
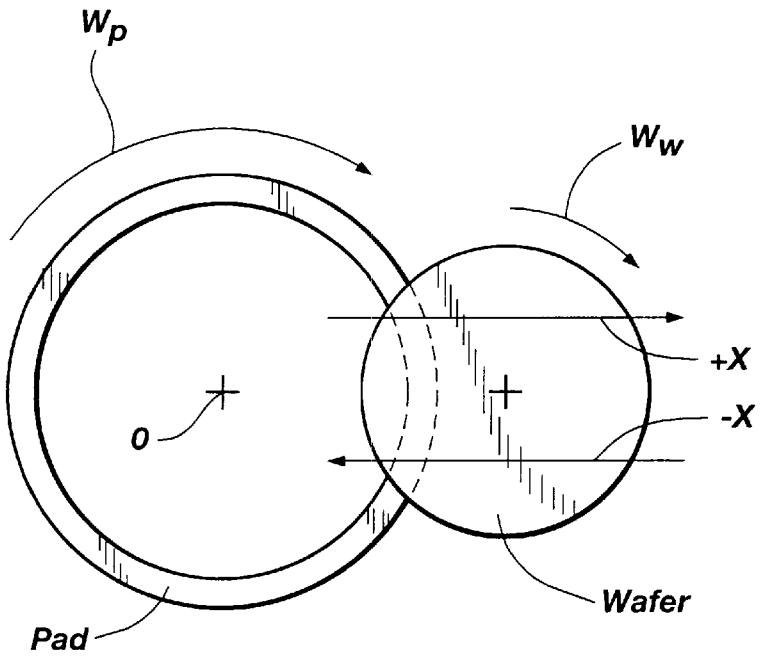
Fig. 1A (PRIOR ART)
FIGS. 1A and 1B are elevational and side views of an illustrative prior art polishing pad implementation.
Figure 1B:
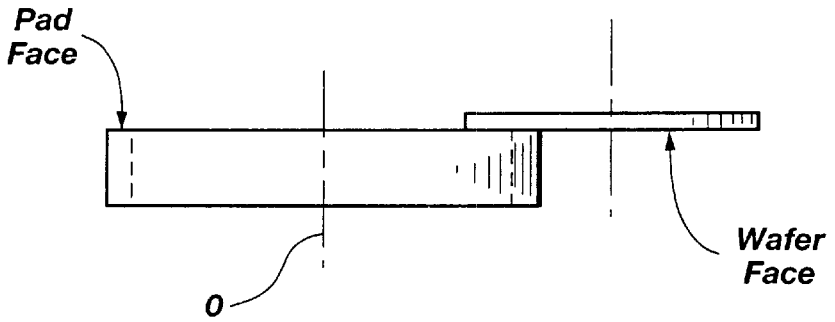
Fig. 1B (PRIOR ART)
Figure 2:
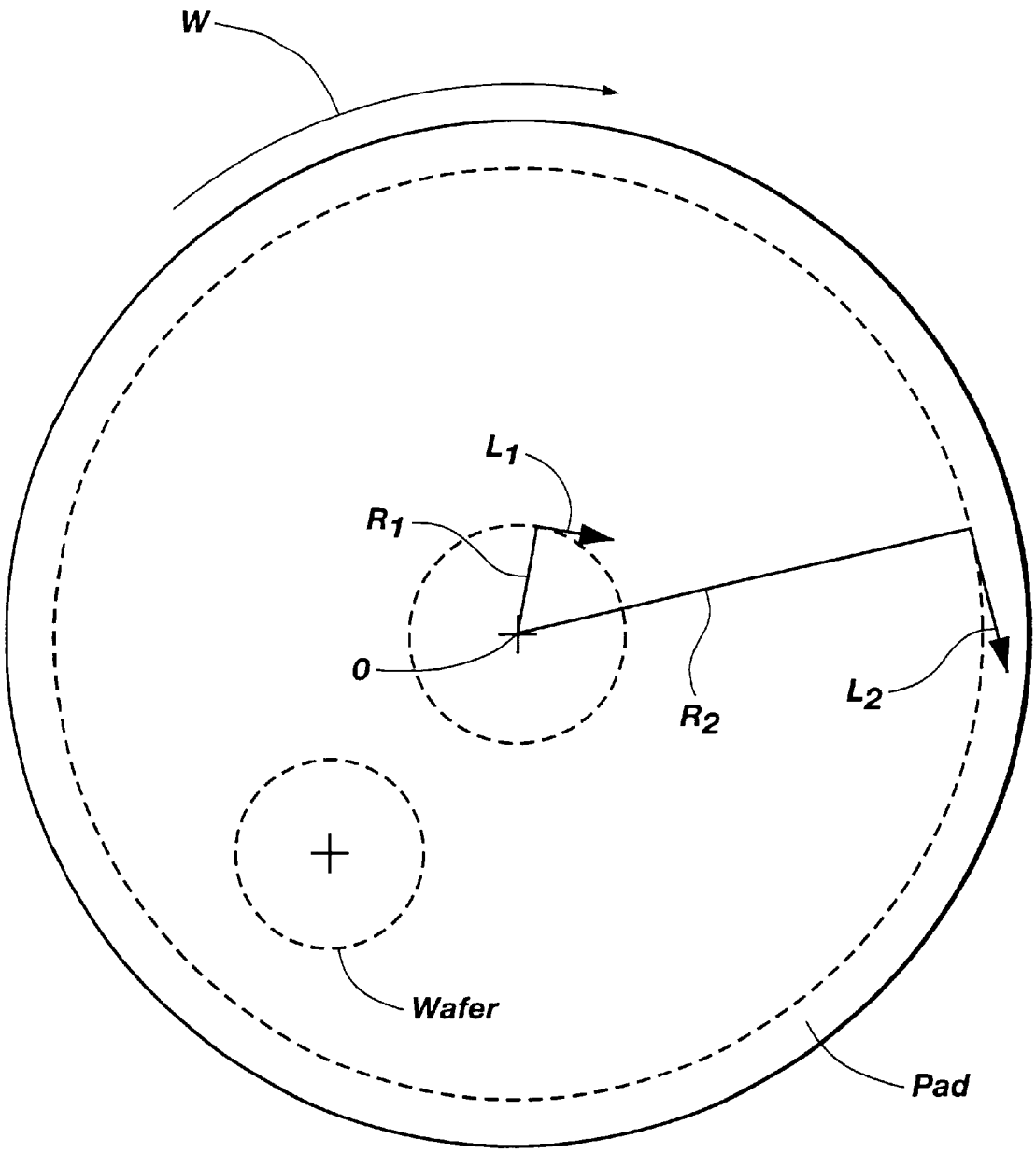
Fig. 2 (PRIOR ART)
FIG. 2 illustrates different linear velocities for different radii on a generic polishing pad.
Figure 3:
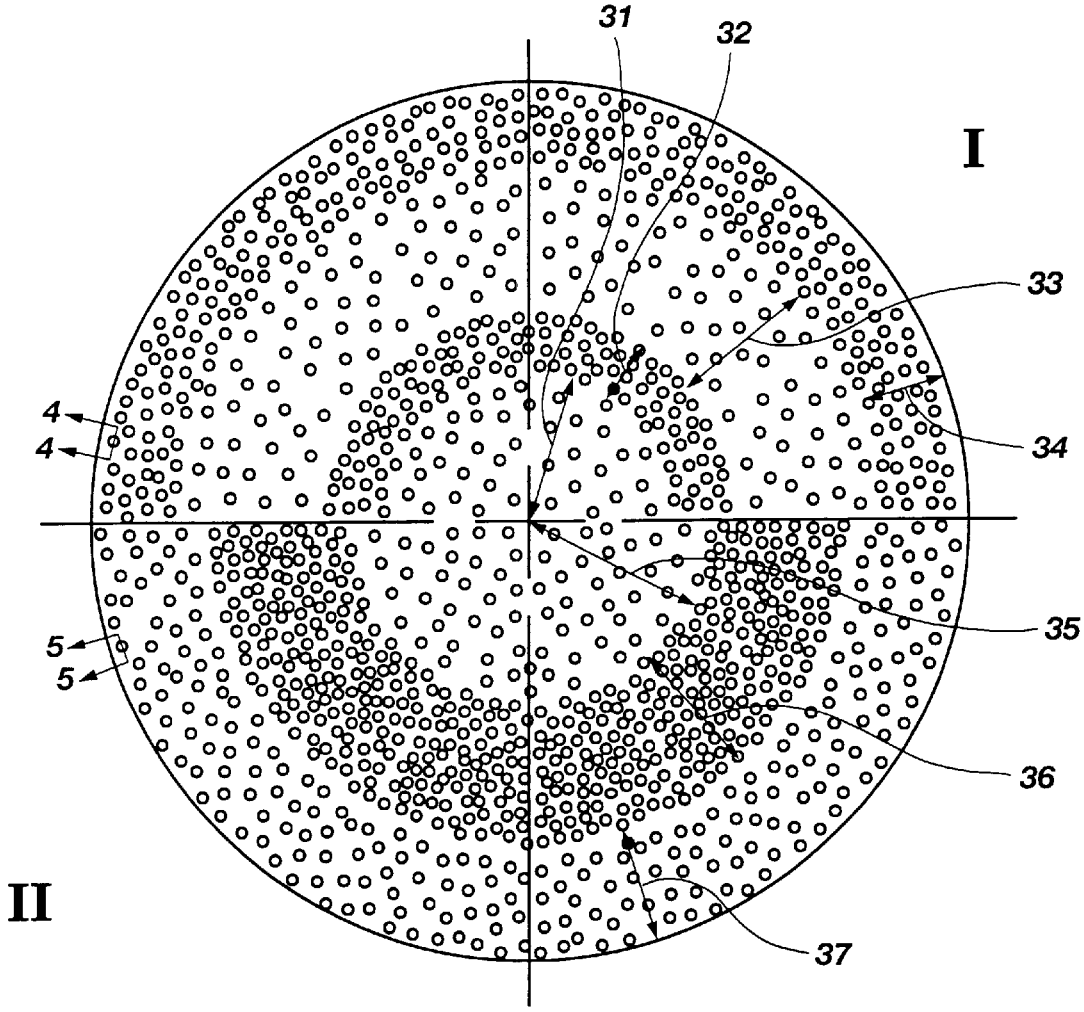
FIG. 3 shows a preferred embodiment of the inventive polishing pad.

Referring now to FIG. 3, the contact surface of a polishing pad constructed in accordance with the present invention is depicted. Two possible patterns are represented, with the upper half of the pad depicting a four-band pattern, and the lower half of the pad depicting a three-band pattern. The upper half of the pad has a center portion of low void density 31 that is adjacent a band of high void density 32, which is adjacent *and indistinctly transistions into* a band of low void density 33, which is adjacent an outer-most band of high void density 34. The lower half of the pad, on the other hand, has a center portion of low void density 35, which is adjacent a band of high void density 36, which is adjacent a band of low void density 37. A polishing pad [(not shown)] (*see FIG. 6*) having continuous variation of void density as a function of radius, such that the polishing rate is also a function of radius is another embodiment.

As disclosed in the aforementioned issued patent, voided surface regions on the pad may be created with a variety of patters. For example, patterns having radial, ray-like voided regions and patterns having a multiplicity of circular voided regions are just two of many possibilities.

Figure 4:
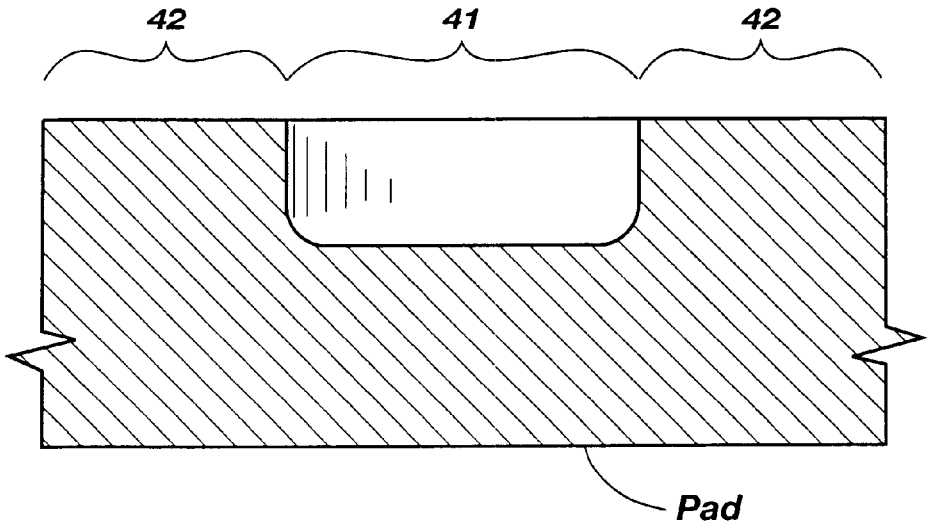
FIG. 4 is a cross-section along line 4—4 of FIG. 3.

Referring now to FIG. 4, a cross-sectional view through line 4—4 of FIG. 3 depicts a first embodiment of the invention. As can be seen in this cross-sectional view, each void 41 is *a* recessed regions, or depressions, between raised portions 42 of the pad. The surface of the raised portions will contact the workpiece during rotational polishing with the pad. By varying the density of the voids, the total arcuate contact with raised surface portions for any given circumference, as defined by a constant radius R, can be established.

Figure 5:
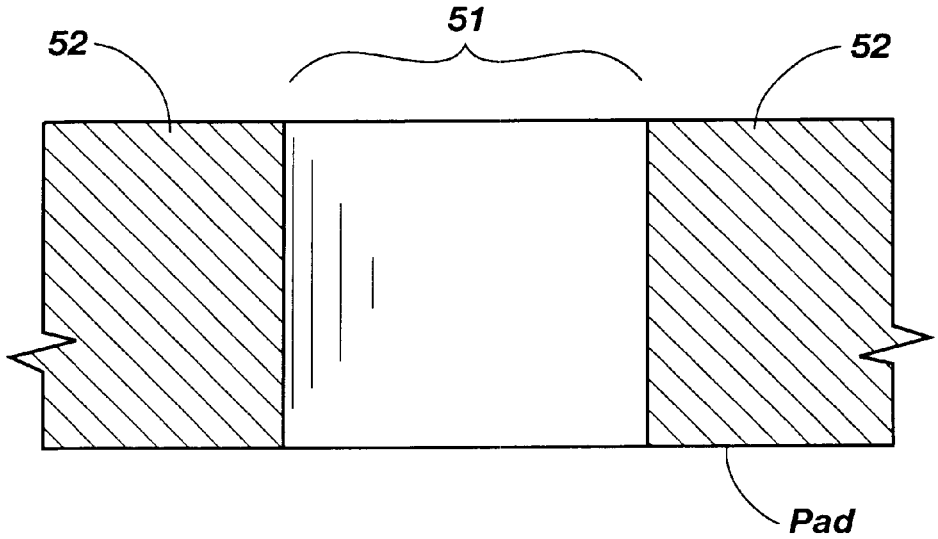
FIG. 5 is a cross-section along line 5—5 of FIG. 3;[.]

Referring now to FIG. 5, a cross-sectional view through line 5—5 of FIG. 3 depicts a second embodiment of the invention. In this embodiment, the voids 41 of FIG. 4 are replaced by holes 51, which extend entirely through the pad 52.

In most instances, it is anticipated that there will be rotational movement of the workpiece about a center axis in order to achieve substantial uniformity of abrasion over the workpiece surface. Generally, the rotational movement of the workpiece is slow in comparison to the rotational movement of the pad.

Although only several embodiments of the invention have been disclosed herein, it will be obvious to those having ordinary skill in the art of polishing and grinding technology that changes and modifications may be made thereto without departing from the scope and the spirit of the invention as claimed.

I claim:

1. A polishing pad rotatable about a central axis, said pad having a circular, planar face perpendicular to said *central* axis, said face to be brought in spinning contact with a workpiece during a polishing operation, said face *extending from said central axis to an outer, continuous, circular periphery and* comprising both raised and voided regions, *wherein at least one of said raised regions is disposed immediately proximate said central axis,* said raised and voided regions being configured so as to produce a controlled nonuniform rate of material removal from said workpiece, said rate of material removal being a non-linear function of distance from the pad's rotational axis to a working radius.

2. The polishing pad of claim 1, wherein high material removal rates correspond to bands of low void density *on said face* and low removal rates correspond to bands of high void density *on said face*.

3. The polishing pad of claim 2, wherein said voids are recessed regions within said face.

4. The polishing pad of claim 2, wherein said voids are holes which extend entirely through the pad.

5. The apparatus of claim 2, wherein said voids are circular.

*6. A rotatable polishing pad having a central axis and a substantially planar contact surface extending substantially continuously from said central axis to an outer, continuous, circular periphery for polishing a workpiece, comprising:*

*at least two perceptibly different substantially arcuate regions on said contact surface;*

*at least one of said contact surface regions including a first density of voided area opening onto said contact surface; and*

*at least another of said contact surface regions including a second density of voided area opening onto said contact surface, said second density of voided area being not equal to said first density of voided area.*

*7. The polishing pad of claim 6, wherein said at least two contact surface regions are substantially contiguous.*

*8. The polishing pad of claim 6, wherein said at least two contact surface regions together extend radially from said central axis to said periphery of said polishing pad.*

*9. The polishing pad of claim 6, further including at least a third substantially arcuate region on said contact surface including a third density of voided area, opening onto said contact surface, wherein said at least three contact surface regions are arranged substantially coaxially, and wherein at least one of said substantially coaxial contact surface regions is interposed between at least two other contact surface regions having either greater or lesser voided area density.*

*10. The polishing pad of claim 9, wherein at least one of said arcuate contact surface regions comprises a substantially circular region extending radially from said central axis, and two others of said at least three contact surface*

*regions each comprises an annular band lying on a larger radius than said circular region.*

*11. The polishing pad of claim 9, wherein said at least three contact surface regions are substantially contiguous.*

*12. The polishing pad of claim 9, wherein said at least three contact surface regions together extend radially from said central axis to said periphery of said polishing pad.*

*13. The polishing pad of claim 6, wherein said differing voided area densities are substantially a function of the number of voids per unit area in a region, the size of the voids in a region, or a combination thereof.*

*14. A rotatable polishing pad having a central axis and a substantially planar contact surface extending substantially continuously from said central axis to an outer, continuous, circular periphery for polishing a workpiece, comprising:*

*at least two perceptibly different, substantially arcuate regions on said contact surface, each of said regions lying at least partially on different radii with respect to said central axis;*

*at least one of said contact surface regions including a first contact area per unit surface area on said contact surface; and*

*at least another of said contact surface regions including a second contact area per unit surface area on said contact surface, said second contact area per unit surface area being not equal to said first contact area per unit surface area.*

*15. The polishing pad of claim 14, wherein said at least two contact surface regions are substantially contiguous.*

*16. The polishing pad of claim 14, wherein said at least two contact surface regions extend radially from said central axis to said periphery of said polishing pad.*

*17. The polishing pad of claim 14, further including at least a third substantially arcuate region on said contact surface including a third density of voided area, opening onto said contact surface, wherein said at least three contact surface regions are arranged substantially coaxially, and wherein at least one of said substantially coaxial contact surface regions is interposed between at least two other contact surface regions having either greater or lesser contact area per unit surface area.*

*18. The polishing pad of claim 17, wherein at least one of said arcuate contact surface regions comprises a substantially circular region extending radially from said central axis, and at least two others of said at least three contact surface regions each comprises an annular band lying on a larger radius than said circular region.*

*19. The polishing pad of claim 17, wherein said at least three contact surface regions are substantially contiguous.*

*20. The polishing pad of claim 17, wherein said at least three contact surface regions together extend radially from said central axis to said periphery of said polishing pad.*

*21. The polishing pad of claim 14, wherein said contact surface includes a plurality of apertures therein, and said differing contact area per unit surface area in said at least two contact surface regions is substantially a function of the number of apertures opening onto said contact surface per unit area in a region, the size of the apertures in a region, or a combination thereof.*

*22. A rotatable polishing pad having a central axis and a contact surface extending substantially continuously from said central axis to an outer, continuous, circular periphery for polishing a workpiece, comprising:*

*a plurality of perceptibly different substantially concentric contact regions on said contact surface;*

*each of said regions providing a different contact area per unit surface area than the contact area per unit surface area of any radially adjacent region; and*

*wherein the contact area per unit surface area of a region lying between two radially adjacent regions is either less than or greater than the contact area per unit surface area of both of said radially adjacent regions.*

*23. The polishing pad of claim 22, wherein at least one of said regions* [are] *is defined by at least one distinct radial boundary.*

*24. The polishing pad of claim 22, wherein at least two of said regions are mutually contiguous and a transition therebetween is indistinct.*

*25. The polishing pad of claim 22, wherein said contact surface includes a plurality of apertures therein, and said differing contact area per unit surface area is substantially a function of the number of apertures opening onto said contact surface per unit area, the size of the apertures, or a combination thereof.*

*26. A rotatable polishing pad having a central axis and a contact surface extending substantially continuously from said central axis to an outer, continuous, circular periphery for polishing a workpiece, said contact surface comprising at least two regions of differing contact area per unit surface area, wherein said contact surface includes a contact area per unit surface area varying non-linearly as a function of distance extending from said central axis to said periphery of said pad.*

*27. The polishing pad of claim 26, wherein said contact surface is marked by a distinct boundary lying at a given radius from said central axis between said at least two regions of differing contact area per unit surface area.*

*28. The polishing pad of claim 26, wherein said contact surface is defined by a gradual transition lying generally proximate a given radius from said central axis between said at least two regions of differing contact area per unit surface area.*

*29. A rotatable polishing pad having a central axis and a contact surface extending substantially continuously from said central axis to an outer, continuous, circular periphery for polishing a workpiece, wherein said contact surface provides a continuous variation in contact area per unit surface area as a non-linear function of radius from said central axis.*

* * * * *